United States Patent [19]
Harding et al.

[11] 3,897,033
[45] July 29, 1975

[54] LOW GLINT HELICOPTER CANOPY STRUCTURE

[75] Inventors: David G. Harding, Brookhaven; John J. Schneider, Media, both of Pa.; Lawrence M. Mead, Jr., Huntington, N.Y.

[73] Assignee: The Boeing Company, Seattle, Wash.

[22] Filed: Jan. 30, 1974

[21] Appl. No.: 438,092

[52] U.S. Cl............ 244/121; 296/97 A; 350/276 R
[51] Int. Cl. .............................................. B64c 1/00
[58] Field of Search...... 244/121, 17.11; 350/276 R, 350/276 SLA, 277, 278, 319; 49/50, 51; 296/97 A, 97 R

[56] References Cited
UNITED STATES PATENTS
2,683,498  7/1954  Van Schaack .............. 350/276 R X FOREIGN PATENTS OR APPLICATIONS
560,664  4/1944  United Kingdom................. 244/121
138,430  12/1952  Sweden............................ 296/97 A
382,821  2/1908  France ............................ 350/276 R

*Primary Examiner*—Duane A. Reger
*Assistant Examiner*—Paul E. Sauberer
*Attorney, Agent, or Firm*—J. M. Corr; F. W. Neitzke

[57] ABSTRACT

A helicopter canopy structure is provided to minimize the risk of detection of glints at long range by observers on the ground. The canopy includes a top window and front windshield constructed of flat, transparent panels which are guarded by opaque baffles to screen the panels from low angle sunlight and block reflection of the sunlight from the panels to minimize glints. The canopy also includes step-sloped side windows comprising a plurality of flat, transparent panels inclined downwardly and inwardly at a slight angle to the vertical to avoid glints.

15 Claims, 6 Drawing Figures

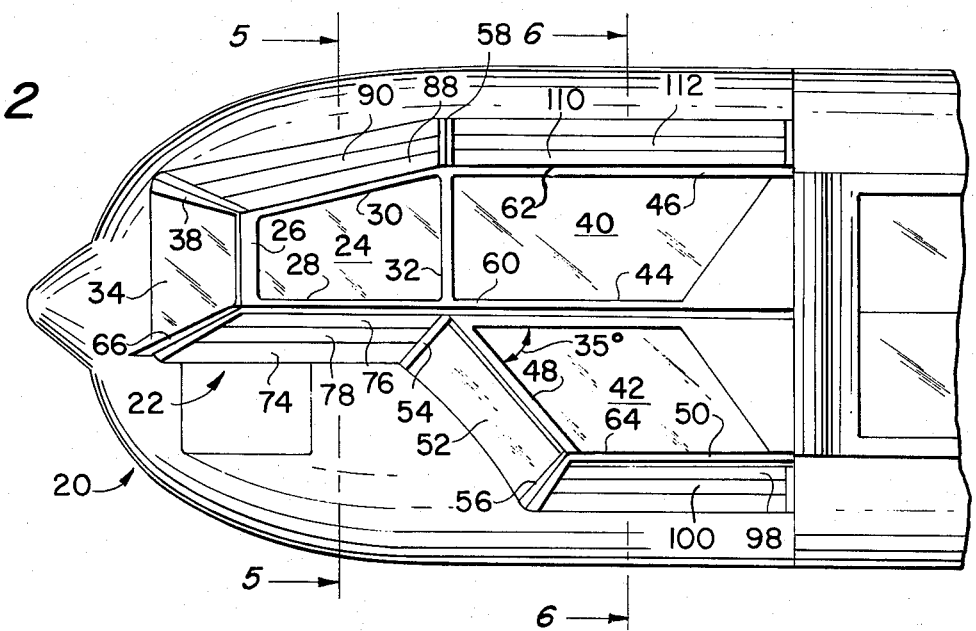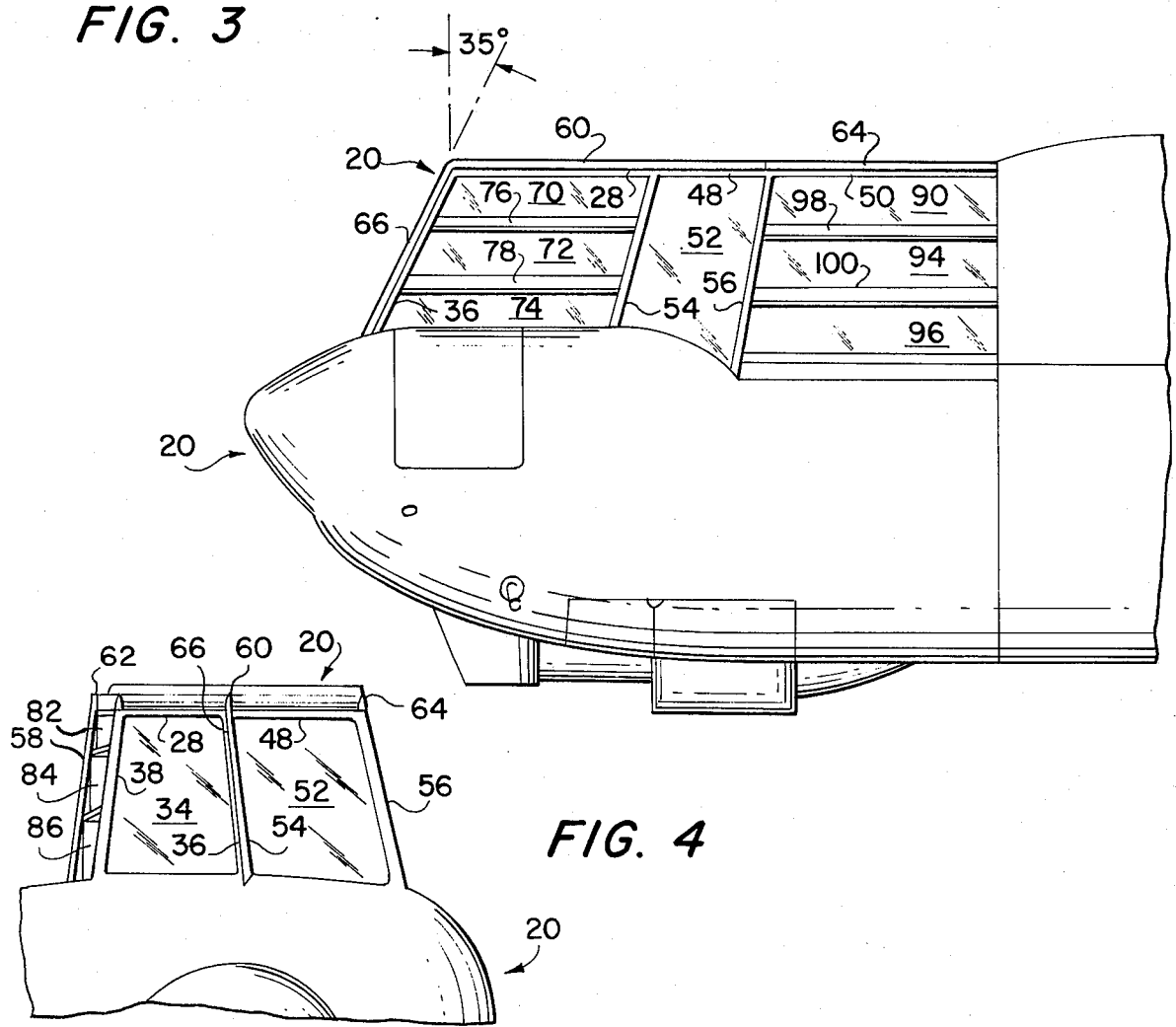

LOW GLINT HELICOPTER CANOPY STRUCTURE

The present invention relates to an aircraft canopy and, more particularly, to a low glint canopy structure for a helicopter which minimizes the possibility of glint detection of the helicopter at long range by an observer on the ground.

The survivability of a helicopter in a battle area, particularly an attack helicopter, depends in large measure on its ability to penetrate the area, conduct its operations, and retire undetected. Flight at low altitudes has been customary to reduce the likelihood of detection. However, low altitude flight increases the possibility of chance detection of the helicopter at long ranges by glint, i.e., reflection of sunlight from the helicopter canopy.

The helicopter canopies of the prior art have typically included curved transparent panels. Such canopies have been generally known as bubble canopies. With respect to avoidance of glint detection, the primary drawback of the bubble canopy is its tendency to reflect incident sunlight in all directions from the canopy. Consequently, the chance of detection of the helicopter by a ground observer is appreciable because the observer is not required to be in any particular orientation relative to the helicopter but can be anywhere on the ground with an equally good chance of observing glints from the helicopter canopy.

To enhance the capability of a helicopter for successful operation in a battle area, it is essential to provide a helicopter canopy structure which minimizes the observability of reflected sunlight at long range. For purposes of the present invention, any distance approximately 1 kilometer or more from the helicopter will be considered long range since, at lesser distances, the helicopter is normally visible to the naked eye without the aid of glints. It is thus extremely important to provide a helicopter canopy with a geometric arrangement of window panels which eliminates or substantially reduces glints from the canopy observable at relatively long distances to avoid advance detection of the helicopter in its movement in a battle area.

The present invention provides a low glint helicopter canopy constructed to generate minimal glints observable at long range. The invention recognizes the special advantage of a flat window panel over a curved panel in the canopy structure in that the flat panel requires the ground observer, helicopter, and sun to be in a unique geometric relationship for glint to be visible by the observer. In addition, the invention recognizes the distinct advantage of baffles or fences arranged on the canopy to screen the flat window panels from sunlight and block reflection of the sunlight from the panels.

In accordance with the invention, a low glint window assembly for an aircraft canopy comprises a substantially flat transparent panel and at least one elongated baffle located adjacent to the panel to screen the panel from sunlight and block reflection of the sunlight from the panel. Preferably, a pair of elongated baffles is located adjacent to opposite edges of the window panel to screen the panel from low angle sunlight and block reflection of the sunlight from the panel. The low glint window assembly is especially suitable for use as the top window or front windshield of the canopy.

In addition, the present invention provides a low glint side window assembly for an aircraft canopy. In accordance with the invention, the low glint side window assembly comprises a plurality of substantially flat, rectangular transparent panels arranged in a spaced, parallel configuration with each of the panels inclined downwardly and inwardly at a slight angle from the vertical. In a preferred embodiment, the lower edge of each panel is located adjacent to the upper edge of its adjacent side panel, and a plurality of substantially flat, opaque plates is located between the lower edge of each panel and the corresponding upper edge of its adjacent panel and arranged in a plurality of planes extending radially from a predetermined position within the canopy to present minimum interference with pilot vision. Each of the transparent panels is inclined downwardly and inwardly at an angle between 2° and 10° from the vertical. The preferred angle of inclination is 6° from the vertical.

Further, the invention contemplates a combination of the low glint top window and front windshield assembly and low glint side window assembly to provide a helicopter canopy of minimum glint detection. The canopy includes a pilot section and a co-pilot section located rearwardly of and offset laterally relative to the pilot section. Pilot and co-pilot windshields are provided for the corresponding sections which are inclined at an angle of 35° from the vertical. Lateral oblique glint on the top surface of the canopy is eliminated by an opaque fence which extends longitudinally along the centerline of the top window of the co-pilot section and along a corresponding lateral edge of the top window of the pilot section and by additional opaque fences extending along opposite lateral edges of both top windows of the canopy. Oblique glint from the pilot windshield is eliminated by an opaque fence extending along the lateral edge of the pilot windshield corresponding to the top centerline of the canopy while oblique glint from the co-pilot windshield is limited by the adjacent side window of the pilot section.

The present invention achieves a helicopter canopy structure which produces minimal glint at long range. The flat window panels and opaque baffles and plates are arranged in a geometric configuration which screens the panels from sunlight and blocks reflection of the sunlight from the panels. The canopy configuration is particularly effective in eliminating observable glints caused by low angle sunlight. Accordingly, the canopy structure permits a helicopter to operate effectively in a battle area with a minimum possibility of glint detection by a ground observer.

The accompanying drawings illustrate a preferred embodiment of the invention and, together with the description, serve to explain the principles of the invention.

Of the drawing:

FIG. 2 is a plan view of the helicopter canopy of FIG. 1;

FIG. 3 is a side elevation of the helicopter canopy;

FIG. 4 is a front elevation of the helicopter canopy;

Figure 1:
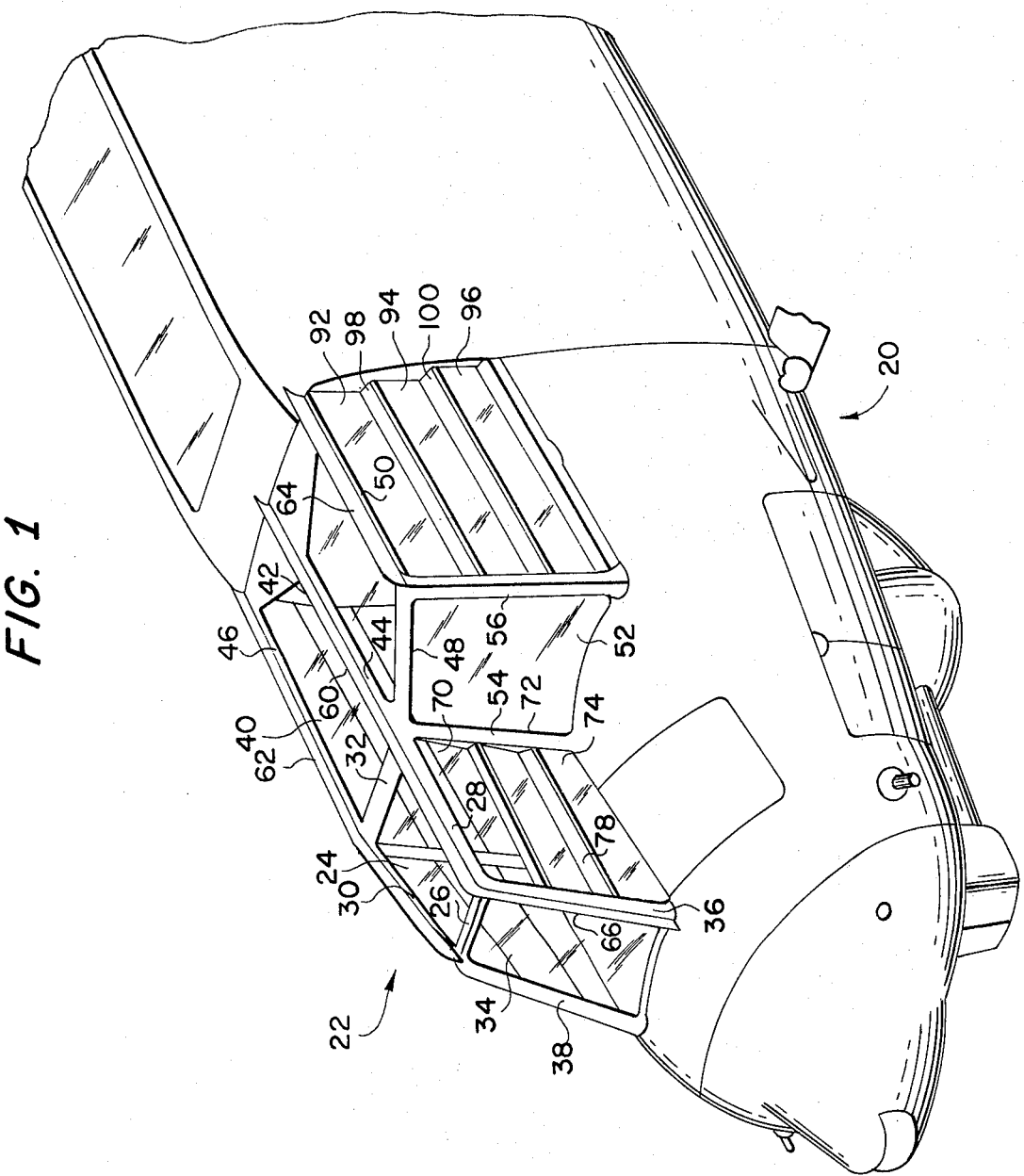
FIG. 1 is a perspective view of the front portion of a helicopter incorporating a low glint canopy constructed according to the principles of the present invention.

Referring to FIG. 1, a helicopter, generally 20, is provided with a canopy 22 including a forward pilot section and a rearward co-pilot section. The canopy consists, in general, of a metal frame adapted to support a plurality of transparent panels which comprise the front windshields, top windows, and side windows of the pilot and co-pilot sections.

The pilot section of canopy 22 includes a first, substantially flat top window comprising a flat, transparent panel 24 having its front edge supported by a transverse frame member 26, its lateral edges supported by first and second longitudinal frame members 28 and 30, and its rear edge supported by a second transverse frame member 32. As shown in FIG. 2, the rear edge of top window panel 24 is larger in width than its front edge. Thus, longitudinal frame member 30 slopes outwardly relative to longitudinal frame member 28. Top window panel 24, transverse frame members 26 and 32, and longitudinal frame members 28 and 30 of the pilot section are preferably located in a substantially horizontal plane.

A substantially flat pilot windshield 34 is inclined downwardly and forwardly from the front edge of top window 24. The upper edge of windshield 34 is supported by transverse frame member 26 and its lateral edges are supported by first and second upright frame members 36 and 38, respectively, which slope upwardly from the helicopter body and connect with transverse frame member 26 and corresponding longitudinal frame members 28 and 30. Windshield 34 and upright frame members 36 and 38 are preferably inclined at an angle of substantially 35° to the vertical.

The co-pilot section is provided with a second, substantially flat top window comprising a pair of flat, transparent panels 40 and 42. Window panel 40 is located rearwardly of panel 24 with its front edge supported by transverse frame member 32 and its rear edge supported by the helicopter fuselage. The lateral edges of panel 40 are supported by longitudinal frame members 44 and 46 which extend rearwardly from longitudinal frame members 28 and 30, respectively. The lateral edge of panel 42 located adjacent to panel 40 is also supported by longitudinal frame member 44 which, in effect, establishes the centerline of the co-pilot section of the canopy. The front edge of panel 42 is supported by an additional transverse frame member 48 which extends outwardly from the intersection of longitudinal frame members 28 and 44 and transverse frame member 32. As shown in FIG. 2, transverse frame member 48 is sloped outwardly at an angle of substantially 35° relative to longitudinal frame member 44. The opposite lateral edge of panel 42 is supported by an additional longitudinal frame member 50 extending rearwardly from the extended end of transverse frame 48 to the helicopter fuselage which supports the rear edge of the panel. Panels 40 and 42 and the supporting frame members for these panels are preferably located in the same, substantially horizontal plane of panel 24.

A substantially flat co-pilot windshield 52 is inclined downwardly and forwardly from the front edge of window panel 42. The upper edge of windshield 52 is supported by transverse frame member 48. Its lateral edges are supported by a pair of upright frame members 54 and 56 which slope upwardly from the helicopter body. Upright frame member 54 connects with the intersection of longitudinal frame members 28 and 44 and transverse frame members 32 and 48, while upright frame member 56 connects with the extended end of transverse frame member 48. Windshield 52 and upright frame members 54 and 56 are preferably inclined at an angle of substantially 35° to the vertical. An additional upright frame member 58 extends upwardly from the helicopter body and connects with the intersection of longitudinal frame members 30 and 46 and transverse frame member 32.

As shown in FIG. 1, an elongated, opaque baffle or fence 60 projects perpendicularly upward from longitudinal frame members 28 and 44. Baffle 60 extends longitudinally along the frame members from the upper edge of the pilot windshield along the lefthand edge of the top window of the pilot section and the centerline of the top window of the co-pilot section to the helicopter fuselage. Similarly, an elongated, opaque baffle or fence 62 projects perpendicularly upward from longitudinal frame members 30 and 46 and extends from the upper edge of the pilot windshield along the righthand edge of the top windows of the pilot section and co-pilot section to the helicopter fuselage. In addition, an elongated, opaque baffle or fence 64 projects perpendicularly upward from longitudinal frame member 50 and extends from the upper edge of the co-pilot windshield along the lefthand edge of the co-pilot section to the helicopter fuselage.

Figure 5:
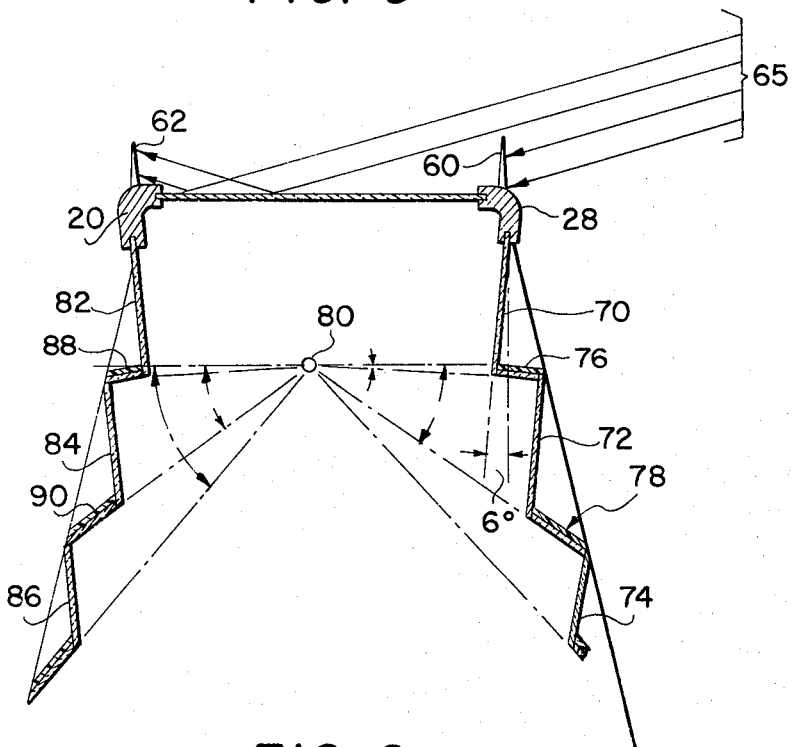
FIG. 5 is a section view of the helicopter canopy taken along lines 5—5 of FIG. 2.

The purpose of elongated, opaque baffles 60, 62 and 64 is to screen the top windows of the pilot and co-pilot sections from sunlight at a low angle of elevation relative to the horizon, and to block reflection of the sunlight from the top windows. As shown in FIG. 5, top window panel 24 of the pilot section is partially screened by opaque baffle 60 from rays of sunlight, indicated by arrows 65, from the sun at low elevation. In addition, the rays of low angle sunlight which impinge on and reflect from top window panel 24 are blocked by baffle 62. Thus, the arrangement of opaque baffles 60 and 62 along opposite edges of window panel 24 reduces the possibility of long range detection of the helicopter by observation of lateral, oblique glints from the top window of the pilot section of the helicopter canopy.

Figure 6:
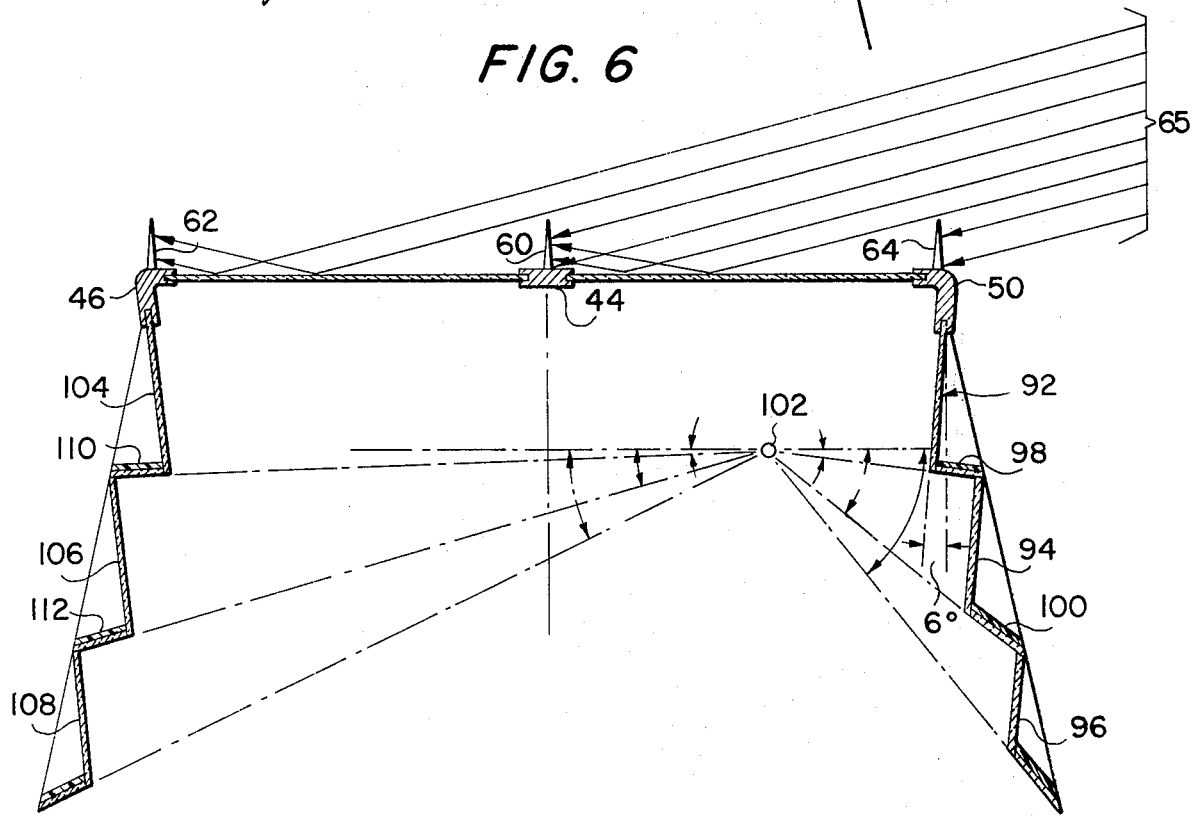
FIG. 6 is a section view of the helicopter canopy taken along lines 6—6 of FIG. 2.

Similarly, as shown in FIG. 6, top window panels 40 and 42 of the co-pilot section of the canopy are partially screened by baffles 60 and 64 from incident rays of sunlight, indicated by arrow 65, from the sun at low elevation. The rays of sunlight which impinge on and reflect from top window panels 40 and 42 are blocked by baffles 62 and 60, respectively. Thus, the arrangement of opaque baffle 60 along the centerline of the top window of the co-pilot section and opaque baffles 62 and 64 along opposite edges of the top window reduces the possibility of long range detection of the helicopter by observation of lateral, oblique glints from the top window of the co-pilot section.

Further, longitudinal oblique glint from the top windows of the pilot and co-pilot sections is blocked by the fuselage and rotor of the helicopter. As shown in FIGS. 1 and 3, the center fuselage of the helicopter is elevated above the horizontal plane of top window panels 24, 40 and 42 of the canopy and, in effect, serves as a lateral baffle to screen the top window panels from low angle sunlight and block reflection of the sunlight from the panels.

An additional opaque baffle or fence 66 projects perpendicularly forward from upright frame member 36 and extends along the lefthand edge of pilot windshield 34. The purpose of opaque baffle 66 is to screen the pilot windshield from sunlight and to block reflection of the sunlight from the windshield. Opaque baffle 66 thus reduces the possibility of long range detection of the helicopter by observation of lateral, oblique glints from the pilot windshield. With respect to co-pilot windshield 52, no separate baffle is required because the pilot section of the canopy screens the windshield from sunlight and blocks reflection of the sunlight from the windshield.

The thickness of opaque baffles or fences 60, 62, 64 and 66 is primarily determined by aerodynamic constraints. In the preferred embodiment, the baffles have a tapered cross section with an average thickness of approximately 0.25 inch.

The baffle height in relation to the width of its adjacent window panel is determined by the maximum sun elevation at which the canopy is to be guarded against glints. The baffle height required to provide full protection against glint detection can be determined by consideration of the various offending sun positions, i.e., elevation and azimuth, which produce glints visible to a ground observer located at long range, e.g., at a distance of 1 kilometer or more from the helicopter. Upon determination of the offending sun positions, the height and configuration of the baffles required for full protection of the window panel can be selected to eliminate or substantially reduce glints at these positions. Further, with baffles located at opposite edges of the window panel, it is only necessary to select a baffle height which provides shading for half of the window area. As shown in FIGS. 5 and 6, one of the baffles screens one half of the window panel while reflection of the sunlight incident on the other half of the window is blocked by the other baffle.

A practical limitation on the baffle height is the desirability of avoiding obstruction of pilot and co-pilot vision from the canopy. In addition, it is also desirable to limit the baffle height to avoid interference with the operation of the helicopter rotor. Accordingly, it is contemplated that some compromise between complete reduction of detectable glint and interference with visibility and rotor operation will usually be necessary to achieve a reasonable baffle height for the canopy structure. For example, in the case of a canopy including top window panels approximately 22 inches in width, elongated opaque baffles of 3 inches in height have been used to minimize glints. It has been found that baffles of this height have completely eliminated glints from the top windows at sun elevations of 15° or less.

With respect to the height of baffle 66 on the pilot windshield, interference with rotor operation is not a limitation. Thus, it is comtemplated that front baffle 66 can exceed top baffles 60, 62 and 64 in height. The primary limitation on the height of baffle 66 is interference with pilot vision. For example, a baffle of 4 inches in height has been employed on the pilot windshield of the helicopter canopy.

A further consideration in the selection of appropriate baffle height is the probability of occurrence of the maximum sun elevation at which the canopy is to be protected against glints. The following table demonstrates the probability of occurrence of various sun elevations relative to the horizon in northern latitudes from 20° to 60°

Probability of Sun Elevations
From 20° to 60° North Latitudes

| Sun Elevation | Probability of Occurrence |
| --- | --- |
| 0–5° | 8.78 |
| 5–10° | 9.28 |
| 10–15° | 9.22 |
| 15–20° | 9.04 |
| 20–25° | 8.77 |
| 25–30° | 8.43 |
| 30–35° | 8.01 |
| 35–40° | 7.52 |
| 40–45° | 6.95 |
| 45–50° | 6.29 |
| 50–55° | 5.05 |
| 55–60° | 3.96 |
| 60–65° | 3.04 |
| 65–70° | 2.26 |
| 70–75° | 1.59 |
| 75–80° | 1.03 |
| 80–85° | .58 |
| 85–90° | .20 |

This table indicates that sun elevations in the range of 0°–55° are most frequently encountered in these northern latitudes. Accordingly, the baffle height can be selected to avoid detectable glints for this range of sun elevation. For purposes of the present invention, any sun elevation within this range will be considered low angle sunlight.

The present invention also provides a low glint side window assembly which minimizes glint from the sides of the canopy. The side window assembly includes a plurality of flat window panels arranged in a stepsloped or inverted jalousie configuration. Referring to FIG. 1, the lefthand side of the pilot section of the canopy includes a side window assembly which is supported by longitudinal frame member 28 and upright frame members 36 and 54. The side window assembly comprises a plurality of substantially flat, rectangular transparent side panels 70, 72 and 74 supported at opposite edges by upright frame members 36 and 54. In addition, the upper edge of side panel 70 is supported by longitudinal frame member 28 and the lower edge of side panel 74 is supported by the helicopter body.

The panels of the side window assembly are arranged in a spaced, parallel configuration with the lower edge of each side panel being located adjacent to the upper edge of its adjacent side panel. As shown in FIG. 5, the lower edge of side panel 70 is located adjacent to and spaced inward from the upper edge of side panel 72 and the lower edge of side panel 72 is located adjacent to and spaced inward from the upper edge of side panel 74.

In addition, a plurality of substantially flat, opaque plates is located between the lower edge of each side panel and the corresponding upper edge of its adjacent side panel. As shown in FIG. 5, an opaque plate 76 is located between the lower edge of side panel 70 and the upper edge of side panel 72. Similarly, an opaque plate 78 is located between the lower edge of side panel 72 and the upper edge of side panel 74.

Each side panel is inclined downwardly and inwardly at angles between 2° and 10° to the vertical to minimize glints observable at long range. Preferably, the angle of inclination of the side panels is substantially 6°. In addition, opaque plates 76 and 78 are arranged in planes extending radially from a point 80 within the canopy which represents the position of the eye of the pilot. The purpose of this arrangement of the opaque plates is to present minimum interference with pilot vision from the canopy.

Similarly, the righthand side of the pilot section is provided with a substantially identical side window assembly comprising a plurality of substantially flat, rectangular transparent side panels 82, 84 and 86 and a pair of opaque plates 88 and 90 supported by longitudinal frame member 30 and upright frame members 38 and 58. Each side panel is inclined downwardly and inwardly at an angle between 2° and 10° to the vertical and, preferably, at an angle of inclination of substantially 6°. In addition, opaque plates 88 and 90 are arranged in planes extending radially from point 80 to present minimum interference with pilot vision.

The co-pilot section of the canopy is provided with similar low glint side window assemblies. Referring to FIG. 1, the lefthand side of the co-pilot section includes a side window assembly comprising a plurality of substantially flat, rectangular transparent panels 92, 94 and 96 supported by longitudinal frame member 50, upright frame member 56, and the helicopter fuselage. As shown in FIG. 6, side panels 92, 94 and 96 are arranged in a spaced, parallel configuration with the lower edge of side panel 92 adjacent to the upper edge of side panel 94 and the lower edge of side panel 94 adjacent to the upper edge of side panel 96. The upper edge of side panel 92 is supported by longitudinal frame member 50, and the lower edge of side panel 96 is supported by the helicopter body. An opaque plate 98 is located between the lower edge of side panel 92 and the upper edge of side panel 94, and an opaque plate 100 is similarly located between the lower edge of side panel 94 and the upper edge of side panel 96.

Each side panel is inclined downwardly and inwardly at an angle between 2° and 10° to the vertical and, preferably, at an angle of inclination of substantially 6°. Opaque plates 98 and 100 are arranged in planes extending radially from a point 102 within the canopy which represents the eye of the co-pilot. The opaque plates thus present minimum interference with co-pilot vision.

Similarly, the righthand side of the co-pilot section is provided with a substantially identical side window assembly comprising a plurality of transparent side panels 104, 106 and 108 and a pair of opaque plates 110 and 112. The side panels and opaque plates are supported by longitudinal frame member 46, upright frame member 58 and the helicopter fuselage. Each side panel is inclined downwardly and inwardly at an angle between 2° and 10° to the vertical and, preferably, at an angle of inclination of substantially 6°. The opaque plates are arranged in planes extending radially from point 102 to present minimum interference with co-pilot vision.

The invention provides a canopy structure for an attack helicopter which minimizes the possibility of long-range detection by glints visible to an observer on the ground. The canopy configuration thus enhances the ability of an attack helicopter to operate in a battle area without glint detection.

The invention in its broader aspects is not limited to the specific details shown and described, and modifications may be made in the details of the low glint helicopter canopy without departing from the principles of the present invention.

What is claimed is:

1. A low glint canopy structure for a helicopter, comprising:

a substantially flat top window;
a plurality of spaced, elongated fences extending longitudinally along said top window to screen said top window from low angle sunlight and block reflection of the sunlight from said top window;
a substantially flat windshield inclined downwardly and forwardly from said top window;
a fence located adjacent to said windshield to screen said windshield from low angle sunlight and block reflection of the sunlight from said windshield; and
a pair of side windows extending downwardly from said top window and rearwardly from said windshield.

2. A low glint canopy structure for a helicopter, comprising:

a substantially flat top window including a front edge and a pair of lateral edges extending rearwardly from said front edge;
a pair of opaque fences extending longitudinally along said lateral edges of said top window to screen said top window from low angle sunlight and block reflection of the sunlight from said top window;
a substantially flat windshield inclined downwardly and forwardly from said front edge of said top window and provided with a pair of lateral edges;
an opaque fence extending along one of said lateral edges of said windshield to screen said windshield from low angle sunlight and block reflection of the sunlight from said windshield; and
a pair of side windows extending downwardly from said lateral edges of said top window and rearwardly from said lateral edges of said windshield.

3. The low glint canopy structure of claim 2, wherein: said windshield is inclined at an angle of substantially 35° from the vertical.

4. The low glint canopy structure of claim 2, wherein each of said side windows comprises:

a plurality of substantially flat, rectangular transparent side panels arranged in a spaced, parallel configuration with each of said side panels inclined downwardly and inwardly at a slight angle from the vertical and with the lower edge of each side panel being located adjacent to the upper edge of its adjacent side panel; and
a plurality of substantially flat, opaque plates located between the lower edge of each side panel and the corresponding upper edge of its adjacent side panel and arranged in a plurality of planes extending radially from a predetermined position within the canopy to present minimum interference with pilot vision.

5. The low glint canopy structure of claim 4, wherein each of said transparent side panels is inclined downwardly and inwardly at an angle between 2° and 10° from the vertical.

6. The side window assembly of claim 4, wherein each of said transparent side panels is inclined downwardly and inwardly at an angle of substantially 6° from the vertical.

7. A low glint canopy structure for a helicopter, comprising:

a pilot canopy including a first substantially flat top window, a substantially flat pilot windshield sloped downwardly and forwardly from said top window, and first and second side windows extending downwardly from opposite sides of said top window and rearwardly from said pilot windshield;
a co-pilot canopy located rearwardly of said pilot canopy and provided with a second substantially flat top window exceeding said first top window in width to provide a front edge extending laterally beyond said first top window, a substantially flat co-pilot windshield sloping downwardly and forwardly from said front edge of said second top window and joining said first side window of said pilot canopy, and third and fourth side windows extending downwardly from opposite sides of said second top window, said third side window extending rearwardly from said co-pilot windshield and said fourth side window extending rearwardly from said second side window of said pilot canopy;

first and second opaque fences extending longitudinally along said opposite sides of said first top window to screen said first top window from low angle sunlight and block reflection of the sunlight from said first top window;

said first opaque fence further extending centrally along said second top window and said second opaque fence further extending longitudinally along the corresponding side of said second top window to screen said second top window from low angle sunlight and block reflection of the sunlight from said second top window; and a third opaque fence extending longitudinally along the other side of said second top window to screen said second top window from low angle sunlight and block reflection of the sunlight from said top window.

8. The low glint canopy structure of claim 7, wherein:
said pilot and co-pilot windshields are sloped at an angle of substantially 35° from the vertical.

9. The low glint canopy structure of claim 7, wherein each of said side windows comprises:
a plurality of substantially flat, rectangular transparent side panels arranged in a spaced, parallel configuration with each of said side panels inclined downwardly and inwardly at a slight angle from the vertical and with the lower edge of each side panel being located adjacent to the upper edge of its adjacent side panel; and
a plurality of substantially flat, opaque plates located between the lower edge of each side panel and the corresponding upper edge of its adjacent side panel, said opaque plates of said pilot canopy being arranged in a plurality of planes extending radially from a predetermined position within said pilot canopy to present minimum interference with pilot vision and said opaque plates of said co-pilot canopy being arranged in a plurality of planes extending radially from a predetermined position within said co-pilot canopy to present minimum interference with co-pilot vision.

10. The low glint canopy structure of claim 9, wherein each of said transparent side panels is inclined downwardly and inwardly at an angle between 2° and 10° from the vertical.

11. The low glint canopy structure of claim 9, wherein each of said transparent side panels is inclined downwardly and inwardly at an angle of substantially 6° from the vertical.

12. In an aircraft canopy, a low glint side window assembly, comprising:
a plurality of substantially flat, rectangular transparent side panels arranged in a spaced, parallel configuration with each of said side panels inclined downwardly and inwardly at a slight angle from the vertical and with the lower edge of each side panel being located adjacent to the upper edge of its adjacent side panel.

13. The aircraft canopy of claim 12, which includes:
a plurality of substantially flat, opaque plates located between the lower edge of each side panel and the corresponding upper edge of its adjacent side panel and arranged in a plurality of planes extending radially from a predetermined position within the canopy to present minimum interference with pilot vision.

14. The side window assembly of claim 12, wherein each of said transparent side panels is inclined downwardly and inwardly at an angle between 2° and 10° from the vertical.

15. The side window assembly of claim 14, wherein each of said transparent side panels is inclined downwardly and inwardly at an angle of substantially 6° from the vertical.

* * * * *